Nov. 4, 1930.  S. H. HALE  1,780,481

SPIRAL CONVEYER

Filed Sept. 14, 1928

INVENTOR.
Stephen H. Hale
BY
ATTORNEY

Patented Nov. 4, 1930

1,780,481

UNITED STATES PATENT OFFICE

STEPHEN H. HALE, OF KANSAS CITY, MISSOURI, ASSIGNOR TO GLEANER COMBINE HARVESTER CORPORATION, OF INDEPENDENCE, MISSOURI, A CORPORATION OF DELAWARE

SPIRAL CONVEYER

Application filed September 14, 1928. Serial No. 306,034.

My invention relates to harvesting mechanisms and more particularly to that type of harvesting machinery comprising the combination of harvesting and threshing mechanisms and commonly known as combines. More specifically the invention relates to spiral conveyers for delivering cut grain from the sickle to the threshing cylinder of a combine, the principal objects of my invention being to provide a device of this character with means for eliminating frictional resistance offered the traveling grain by the end wall of the conveyer housing and to reduce wear on the end wall due to such friction.

In accomplishing these and other objects of the invention I have provided improved details of structure the preferred forms of which are illustrated in the accompanying drawings, wherein.

Figure 1:
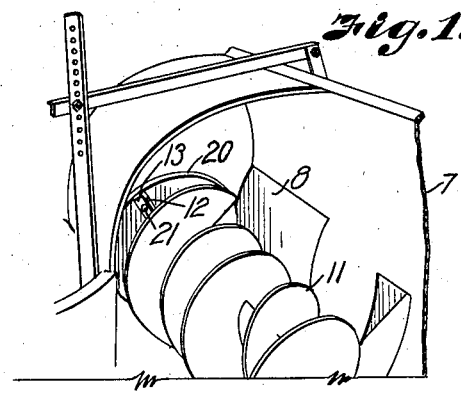
Fig. 1 is a perspective view of the discharge end of a spiral conveyer provided with a terminal disk and mounted in a conveyer housing.
Figure 2:
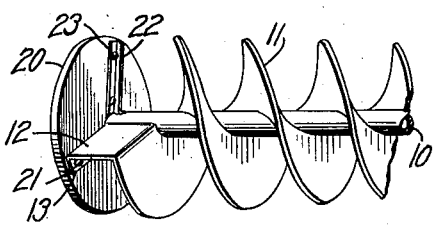
Fig. 2 is a perspective view of the discharge end of a spiral conveyer illustrating the method of attaching a terminal disk thereto.
Figure 3:
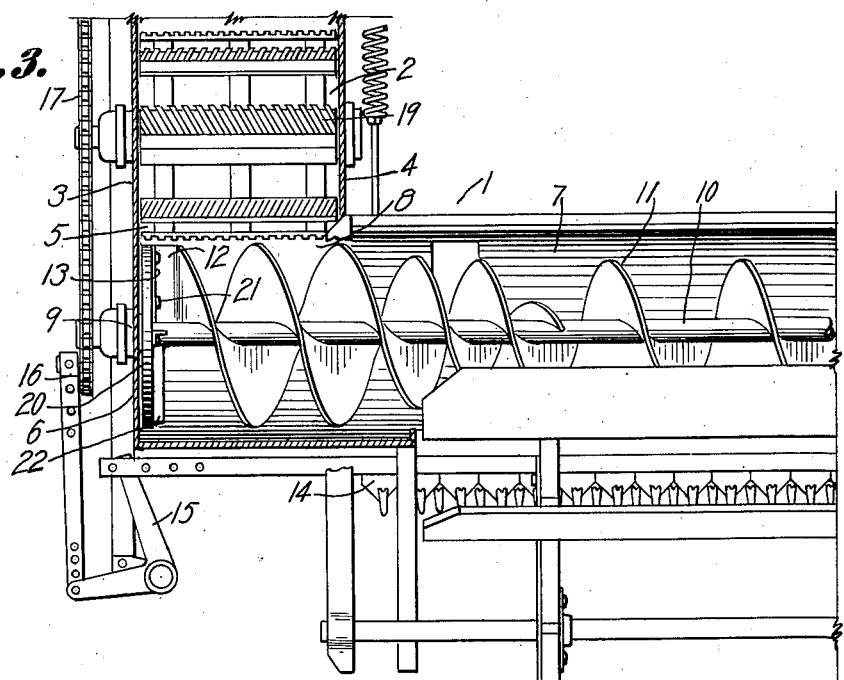
Fig. 3 is a portional plan view partly in section of a combine harvester illustrating application of the disk to the spiral conveyer and its mounting in the conveyer housing.

Referring in detail to the drawings:

1 designates a combine harvester including a longitudinal separator (not shown) terminating in a cylinder housing 2 having side walls 3 and 4 and an open throat 5.

Extending transversely to, and having its end wall 6 in alignment with the side wall 3 of the cylinder housing is a horizontal conveyer housing 7 having an opening 8 communicating with the throat 5. Rotatably mounted in the conveyer housing end walls in bearings such as 9 is a shaft 10 carrying a continuous spiral 11 terminating at its discharge end in a radial wing portion 12 provided with an end flange 13.

Grain such as wheat when harvested with a combine is cut by a sickle 14 mounted adjacent to and forwardly of the conveyer housing and actuated through a bell crank 15 from an eccentric 16 driven from other parts of the machine by a chain belt 17. A reel 18 aids in delivering the cut material to the conveyer, rotation of the spiral carrying the grain to the discharge end of the housing through the opening 8 and to a cylinder 19 mounted transversely in the throat 5 of the housing 2.

Considerable resistance is offered however to the delivery of the grain through the opening 8 by the end wall 6 of the conveyer housing and I have therefore provided the conveyer with a terminal disk 20 fixed to the flange 13 of the spirals by rivets 21. Further means for securing the disk to the conveyer include angle irons 22 extending radially from and fixed to the shaft 10 by means such as welding, the disk being attached to the angles by rivets 23.

With the spiral conveyer provided with a terminal disk as described, cut grain moved in the conveyer housing towards the discharge end by rotation of the continuous spiral is brought into contact with the disk. Due to rapid rotational movement of the disk, centrifugal force created thereby assists in delivering the cut material through the opening 8 into contact with the cylinder 19. The relative large diameter of the disk further prevents the moving grain from wearing the end wall 6 of the conveyer housing.

Figure 4:
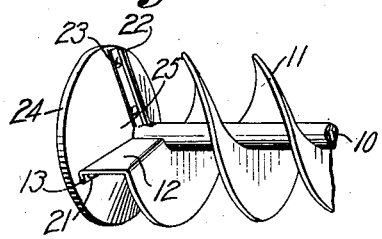
Fig. 4 is a perspective view similar to Fig. 2 illustrating a modified form of conical disk attached to the conveyer.

The modified form of disk illustrated in Fig. 4, comprises a conical disk 24 having its apex 25 adjacent the end of the shaft 10, the disk being secured to the conveyer in like manner as in the preferred form.

What I claim and desire to secure by Letters Patent is:

1. In combination with a conveyer housing having a lateral discharge opening at one end, a shaft rotatable in said housing, a spiral conveyer blade on the shaft, terminating in a wing radial to and substantially parallel with the shaft, and a stop member on the shaft at the end of the housing cooperative with said wing for interrupting travel of grain longitudinally in the housing and diverting the grain into said opening.

2. In combination with a conveyer housing having a lateral discharge opening at one end, a shaft rotatable in said housing, a spiral conveyer blade on the shaft, terminating in a wing radial to the shaft, and a disk on the shaft at the end of the housing cooperative with said wing for interrupting travel of grain longitudinally in the housing and diverting the grain into said opening.

3. In a harvester attachment for a thresher including a sickle, a conveyer for receiving cut grain from the sickle and delivering it to the thresher comprising a shaft, a continuous conveyer spiral on the shaft and a concentric disk fixed transversely on the end of the shaft for delivering cut grain to the thresher.

4. In a harvester attachment for a thresher including a sickle, a conveyer for receiving cut grain from the sickle and delivering it to the thresher comprising a shaft, a continuous conveyer spiral on the shaft, radial supports fixed to the end of the shaft and a concentric disk fixed to the supports.

5. In a harvester attachment for a thresher including a sickle, a conveyer for receiving cut grain from the sickle and delivering it to the thresher comprising a shaft, a continuous conveyer spiral on the shaft terminating at its discharge end in a wing portion having an end flange, radial supports fixed to the end of the shaft, and a concentric disk fixed to the supports and end flange.

In testimony whereof I affix my signature.

STEPHEN H. HALE.